Patented Apr. 21, 1942

2,280,639

UNITED STATES PATENT OFFICE 2,280,639

COMPLEX COMPOUNDS OF QUINATES AND DIURETICS

Robert S. Shelton, Mariemont, Ohio, assignor to The Wm. S. Merrell Company, Reading, Ohio, a corporation of Delaware No Drawing. Application July 22, 1939, Serial No. 286,031

3 Claims. (Cl. 260—253)

This invention relates to new double salts of quinic acid which have important advantages as diuretics and myocardial stimulants.

Quinic acid is a product which occurs naturally in several plants. It is a hexa hydro-tetrahydroxy benzoic acid, usually represented by the structure

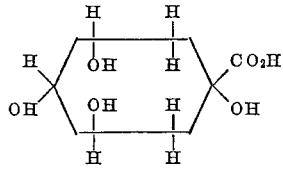

The present invention provides new compounds of quinic acid which are double salts or complexes of quinic acid with an alkali or alkaline earth metal and a xanthine diuretic, and which have valuable therapeutic properties.

In accordance with the present invention, double salts or complexes of quinates of alkali or alkaline earth metals with the xanthine diuretic compounds are provided. The resulting double salts or complexes have improved therapeutic properties as compared with the diuretic alone, or various known double salts of the diuretics with various salts of organic acids, as the quinate apparently promotes the diuretic action of the diuretic, improves its assimilation, increases tolerance, and decreases side reactions.

Included among the new compositions which have important advantages are the double salts of quinic acid with such xanthine diuretics as caffeine, theobromine, and theophyllin.

The exact constitution of the new compositions of the invention is not known to me. From some of their properties, e. g., homogeneity, stability in solution and physical appearance, it seems that the compounds are true double salts; but whether they are true double salts, or simple intimate admixtures resulting from the process advantageously used in their preparation, the quinate present greatly enhances the therapeutic effectiveness of the diuretic used.

The new compounds of the invention may be prepared in various ways, for example, by adding to an aqueous solution of the alkali metals or alkaline earth metal quinate the equivalent proportion of the diuretic, e. g., calcium theobromine; or by adding an alkali or alkaline earth metal carbonate to a mixed solution of quinic acid and the diuretic, or in other known ways of preparing double salts.

The salts, when prepared, are obtained as solutions in water, but may be obtained in solid form either by evaporating the solution or by precipitation with an organic solvent. Small quantities of suitable antioxidants, such as hydroquinone, the butyl ether of hydroquinone or the like may be added to stabilize the compositions. With the solutions, buffer salts, such as sodium acetate or sodium phosphate may be added to control the pH.

As quinic acid and the quinates are readily oxidized, the new compositions should be kept out of contact with air or oxygen, and in preparing them, deoxygenated, e. g., boiled, water should be used and the various operations and final sealing should be in an inert atmosphere, advantageously a carbon dioxide or nitrogen atmosphere.

The invention will be further illustrated by the following specific examples, but it is not limited thereto.

*Example 1.*—To an aqueous solution containing 1 mole of calcium quinate is added 1 mole of calcium theophyllin. The calcium theophyllin readily goes into solution, forming a double salt or complex which may be obtained as a dry product by evaporation of the water under a vacuum or by precipitation with an organic solvent. The product has the same general therapeutic properties as theophyllin, but is quite soluble, is well tolerated, and, as compared with theophyllin, is a more effective diuretic, is less irritating, causes less nausea, and can be administered over long periods of time without undesirable effects. Accordingly, the double salt has important advantages as a diuretic and a myocardial stimulant.

In a similar fashion, the corresponding double salts of calcium quinate with other xanthine diuretics, e. g., caffeine and theobromine, are readily prepared. From a therapeutic standpoint, these have the same general advantages as the calcium quinate-calcium theophyllin composition.

*Example 2.*—To 1 mole of potassium quinate in 10% aqueous solution is added 1 mole of calcium theophyllin, with formation of a complex having valuable properties as a diuretic. If desired in solid form, e. g., for oral administration, it may be isolated by evaporating the water under vacuum, or by precipitation with alcohol or the like. If desired for administration by injection, it may be sealed in ampoules, in an inert atmosphere as a 10% solution, etc.

Theobromine and caffeine similarly form complexes or double salts with alkali metal quinates which have important advantages.

*Example 3.*—To a mixed aqueous solution containing 1 mole of quinic and 1 mole of theophyllin is added 2.2 moles of calcium carbonate.

Carbon dioxide is evolved, and after the reaction is complete, the solution is filtered. The calcium quinate-calcium theophyllin may be isolated from the filtrate by evaporation under vacuum, or precipitation with an organic solvent; or the filtrate may be used as such.

I claim:

1. Double salts of a compound of the class consisting of non-toxic alkali and alkaline earth metal quinates with a xanthine diuretic.

2. Double calcium salts of quinic acid and a xanthine diuretic.

3. Calcium quinate-calcium theophyllin double salt.

ROBERT S. SHELTON.